United States Patent
Dhanapal

(10) Patent No.: US 10,848,554 B2
(45) Date of Patent: Nov. 24, 2020

(54) MEMORY EFFICIENT ASYNCHRONOUS HIGH AVAILABILITY REPLICATION

(71) Applicant: Oracle International Corporation, Redwood Shores, CA (US)

(72) Inventor: Uthayakumar Dhanapal, Perambalur (IN)

(73) Assignee: Oracle International Corporation, Redwood Shores, CA (US)

(*) Notice: Subject to any disclaimer, the term of this patent is extended or adjusted under 35 U.S.C. 154(b) by 397 days.

(21) Appl. No.: 15/474,732

(22) Filed: Mar. 30, 2017

(65) Prior Publication Data

US 2018/0288148 A1 Oct. 4, 2018

(51) Int. Cl.
*H04L 29/08* (2006.01)
*H04L 12/861* (2013.01)

(52) U.S. Cl.
CPC ...... *H04L 67/1095* (2013.01); *H04L 67/1097* (2013.01); *H04L 49/90* (2013.01)

(58) Field of Classification Search
CPC . H04L 67/1095; H04L 69/40; H04L 67/1097; H04L 67/1004; H04L 49/557; H04L 43/0823; G06F 3/067; G06F 3/0619; G06F 3/065; G06F 11/2046; G06F 11/2023; G06F 11/1451; G06F 11/1469; G06F 16/184; G06F 3/0641; G06F 3/0647; G06F 11/0751; G06F 11/0793; G06F 11/2033; G06F 2206/1012
See application file for complete search history.

(56) References Cited

U.S. PATENT DOCUMENTS

| | | | | |
|---|---|---|---|---|
| 7,231,391 | B2* | 6/2007 | Aronoff | G06F 11/1443 |
| 8,055,745 | B2* | 11/2011 | Atluri | G06F 11/1453 |
| | | | | 709/223 |
| 8,271,447 | B1* | 9/2012 | Natanzon | G06F 11/1471 |
| | | | | 707/660 |
| 8,386,425 | B1* | 2/2013 | Kadayam | G06F 11/2064 |
| | | | | 707/613 |
| 8,503,288 | B1* | 8/2013 | Howard | H04L 49/557 |
| | | | | 370/217 |
| 8,589,504 | B1* | 11/2013 | Ofer | H04L 67/1097 |
| | | | | 709/212 |
| 9,875,042 | B1* | 1/2018 | Natanzon | G06F 11/2097 |
| 2003/0002502 | A1* | 1/2003 | Gibson | H04L 1/0083 |
| | | | | 370/389 |
| 2003/0204756 | A1* | 10/2003 | Ransom | H04L 67/02 |
| | | | | 713/300 |
| 2005/0141443 | A1* | 6/2005 | Kim | H04B 7/022 |
| | | | | 370/312 |
| 2006/0253767 | A1* | 11/2006 | Winarski | G06F 11/1088 |
| | | | | 714/755 |

(Continued)

*Primary Examiner* — Kamal B Divecha
*Assistant Examiner* — Alex H. Tran
(74) *Attorney, Agent, or Firm* — Ferguson Braswell Fraser Kubasta PC

(57) ABSTRACT

A method for data replication may include obtaining data, generating a data packet including the data and a logical unit number (LUN) corresponding to a logical unit of a storage array, generating a metadata packet including the LUN and metadata that identifies a region of the logical unit, transmitting the data packet and the metadata packet to a first replicator, transmitting the metadata packet to a second replicator, and transmitting the data packet to a target site.

11 Claims, 9 Drawing Sheets

(56) References Cited

U.S. PATENT DOCUMENTS

| | | | |
|---|---|---|---|
| 2012/0072640 A1* | 3/2012 | Crawford | G06F 3/0607 |
| | | | 711/103 |
| 2015/0172111 A1* | 6/2015 | Lalsangi | H04L 67/42 |
| | | | 709/220 |
| 2015/0172188 A1* | 6/2015 | Levy | H04L 45/74 |
| | | | 370/392 |
| 2015/0363319 A1* | 12/2015 | Qi | G06F 11/2028 |
| | | | 711/121 |
| 2016/0004721 A1* | 1/2016 | Iyer | G06F 16/184 |
| | | | 707/649 |
| 2016/0042090 A1* | 2/2016 | Mitkar | G06F 11/1448 |
| | | | 707/649 |
| 2016/0127467 A1* | 5/2016 | Mu | H04L 67/1097 |
| | | | 709/213 |
| 2016/0162188 A1* | 6/2016 | Padia | G06F 13/102 |
| | | | 710/112 |
| 2016/0231948 A1* | 8/2016 | Gupta | G06F 3/067 |
| 2016/0259693 A1* | 9/2016 | Sundararaman | G06F 11/1088 |
| 2017/0091056 A1* | 3/2017 | Watanabe | G06F 11/2069 |
| 2017/0155713 A1* | 6/2017 | Powell | G06F 3/067 |
| 2017/0185309 A1* | 6/2017 | Xu | G06F 11/2071 |
| 2017/0235950 A1* | 8/2017 | Gopalapura Venkatesh | |
| | | | G06F 21/6218 |
| | | | 726/24 |
| 2017/0315725 A1* | 11/2017 | McKean | G06F 11/2092 |
| 2017/0346931 A1* | 11/2017 | Vyas | H04W 76/20 |
| 2018/0004416 A1* | 1/2018 | Okita | G06F 3/061 |
| 2018/0095855 A1* | 4/2018 | Sanakkayala | G06F 9/45558 |

\* cited by examiner

MEMORY EFFICIENT ASYNCHRONOUS HIGH AVAILABILITY REPLICATION

BACKGROUND

In distributed computing, high availability is typically provided via data replication across N nodes, in order to handle N−1 failures. An important objective for high availability continuous data protection (CDP) replication (where data is replicated whenever data is changed) is ensuring that replicator failures are non-disruptive. That is, replication should continue even when a replicator fails, so that data may be continuously backed up. Typical asynchronous CDP solutions for storage area networks (SAN) provide high availability by replicating entire incoming data streams across multiple replicators at the source or target site, thereby incurring substantial overhead in terms of both memory utilization and data transmission bandwidth.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for data replication including obtaining data, generating a data packet including the data and a logical unit number (LUN) corresponding to a logical unit of a storage array, generating a metadata packet including the LUN and metadata that identifies a region of the logical unit, transmitting the data packet and the metadata packet to a first replicator, transmitting the metadata packet to a second replicator, and transmitting the data packet to a target site.

In general, in one aspect, one or more embodiments relate to a system for data replication including a plurality of replicators including a first replicator and a second replicator, and a storage array configured to obtain data from a host server, generate a data packet including the data and a logical unit number (LUN) corresponding to a logical unit of the storage array, generate a metadata packet including the LUN and metadata that identifies a region of the logical unit, and transmit the data packet and the metadata packet to the first replicator. The first replicator is configured to transmit the metadata packet to the second replicator and transmit the data packet to a target site.

In general, in one aspect, one or more embodiments of the invention relate to a non-transitory computer readable medium including instructions that, when executed by a processor, perform a method for data replication including obtaining data, generating a data packet including the data and a logical unit number (LUN) corresponding to a logical unit of a storage array, generating a metadata packet including the LUN and metadata that identifies a region of the logical unit, transmitting the data packet and the metadata packet to a first replicator, transmitting the metadata packet to a second replicator, and transmitting the data packet to a target site.

Other aspects of the invention will be apparent from the following description and the appended claims.

DETAILED DESCRIPTION

Figure 1A:
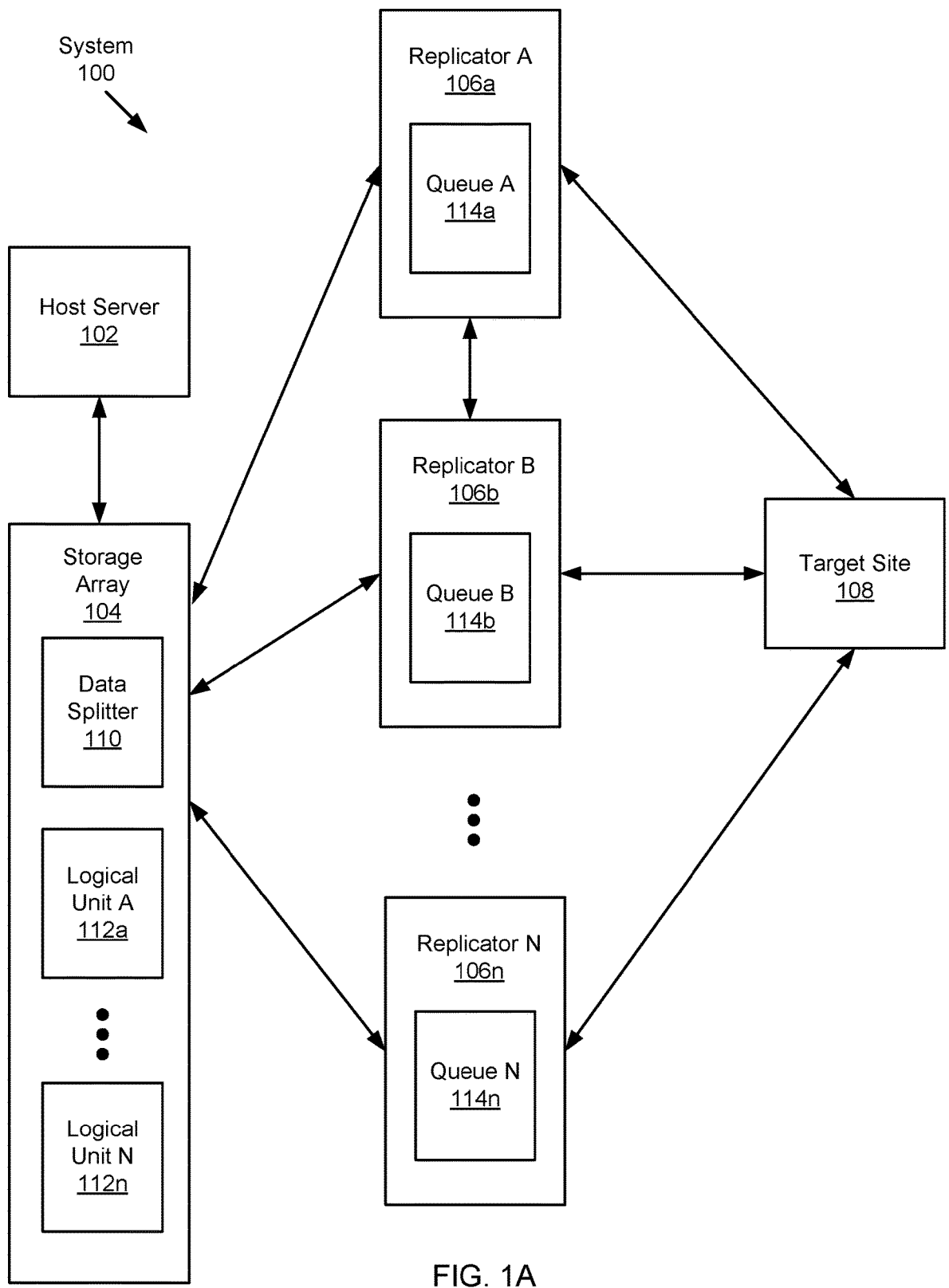
FIG. 1A and FIG. 1B show systems in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to ensuring high availability continuous data replication (CDP) in a storage area network (SAN) in a memory-efficient manner. Instead of replicating an entire data stream at each replicator, metadata may be replicated, enabling more efficient use of memory, without compromising high availability. In one or more embodiments, the metadata may refer to data that has already been persisted in a storage array, thereby eliminating the need to replicate the data itself. Replicators may use queues to store data and corresponding metadata until the data has been replicated (e.g., persisted) at a target site.

In one or more embodiments, when data is received from a host, the storage array transmits a data packet containing the data to a primary replicator for the data, which then stores the data packet (or the data included therein) in a queue. The primary replicator may be selected in any manner, such as, for example, a round robin selection process. One or more secondary replicators in the high availability cluster may store metadata corresponding to the stored data. The complete data may be regenerated (e.g., from the storage array) using the stored metadata in case the primary replicator fails. For example, the metadata may describe a region in a logical unit of the storage array that includes the data. The primary replicator then transmits the data packet to the target site. In one or more embodiments, if the primary replicator fails before it transmits the data packet to the target site, a secondary replicator may use metadata stored in its queue to retrieve the data from the corresponding logical unit, and then transmit the data to the target site.

Replicating metadata instead of data reduces memory requirements, which may increase the effective capacity of the queues used by the replicators. Transmitting metadata reduces data transmission bandwidth requirements, enabling the overall replication system to be more tolerant of data transmission delays, while maintaining write-order fidelity at the target site.

FIG. 1A shows a system (100) in accordance with one or more embodiments of the invention. As shown in FIG. 1A, the system (100) includes a host server (102), a storage array (104), replicators (106a-106n), and a target site (108). In one or more embodiments, the host server (102), replicators (106a-106n), and target site (108) may each be all or part of a computing system, such as, for example, the computing system (500) discussed below in the description of FIG. 5A, or may be all or part of a client device, such as, for example, the client device (526) discussed below in the description of FIG. 5B. In one or more embodiments, the host server (102), storage array (104), replicators (106a-106n), and target site (108) may communicate over a network (e.g., the network (520) described with respect to FIG. 5B).

In one or more embodiments, the host server (102) includes functionality to transmit data to the storage array (104). In one or more embodiments, the storage array (104) is a data storage system used for block-based, file-based or object storage. The storage array (104) may include multiple different storage units and/or devices, including spinning hard disk drives (HDDs), solid-state disk drives (SSDs), etc. The multiple different storage units and/or devices may or may not be of the same type, and may or may not be located at the same physical site. In one or more embodiments, the storage array (104) includes both persistent (i.e., non-volatile) storage and non-persistent (i.e., volatile) storage. The storage array (104) may include a controller that provides a level of abstraction (e.g., via a storage area network (SAN)) over the physical drives of the storage array (104). In one or more embodiments, the units and/or devices of the storage array (104) may be interconnected by a sub-network (e.g., a high-speed storage-area network (SAN)) in order to present a shared pool of storage (e.g., to the host server (102)).

In one or more embodiments, the storage array (104) includes a data splitter (110) and logical units (112a-112n). Each logical unit (112a-112n) may correspond to a block of data. Each logical unit (112a-112n) may be identified by a logical unit number (LUN). In one or more embodiments, the storage array (104) includes functionality to receive data from the host server (102). In one or more embodiments, the storage array (104) includes functionality to store data in a logical unit (112a-112n).

In one or more embodiments, each replicator (106a-106n) includes functionality to transmit data stored in the storage array (104) to the target site (108). In one or more embodiments, each replicator (106a-106n) includes a queue (114a-114n). In one or more embodiments, the queue (114a-114n) is implemented using the non-persistent storage (504) and/or the persistent storage (506) of FIG. 5A.

In one or more embodiments, the replicators (106a-106n) may have separate failure modes. For example, the failure of one replicator (106a-106n) may not cause a failure of another replicator (106a-106n). Using multiple replicators (106a-106n) with separate failure modes may facilitate continuous data replication (CDP), based on a failover procedure where one replicator (106a-106n) may perform a task of a replicator (106a-106n) that has incurred a failure.

Figure 1B:
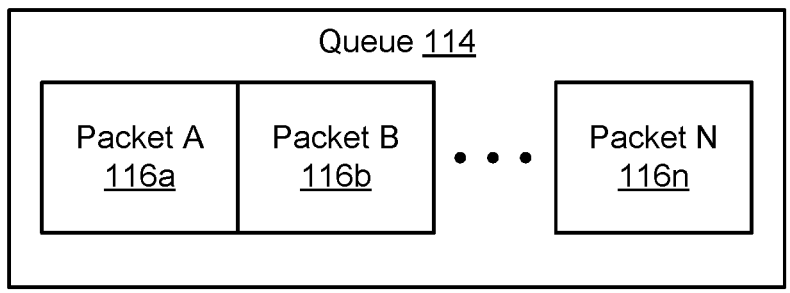
Figure 1B:
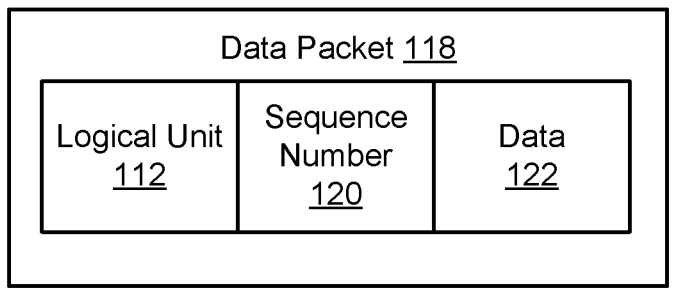
Figure 1B:
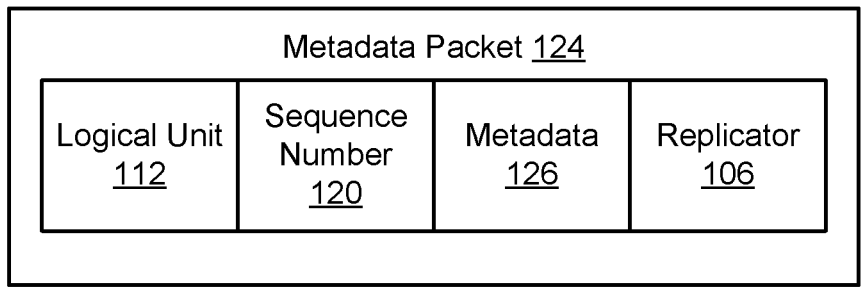
Figure 1B:
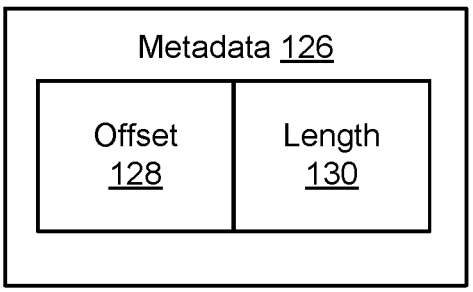

Turning to FIG. 1B, in one or more embodiments, a queue (114) includes packets (116a-116n). In one or more embodiments, a packet (116a-116n) may be a data packet (118). The data packet (118) may include a logical unit (112) (e.g., a LUN), a sequence number (120), and data (122). In one or more embodiments, the data (122) represents a unit of data to be replicated. In one or more embodiments, the sequence number (120) is a numeral that indicates the order in which the corresponding data (122) was generated (e.g., by the host server (102)). For example, a sequence number (120) of 7 may indicate that the corresponding data (122) in the data packet (118) is the seventh unit of data in a stream of data. In one or more embodiments, the sequence number (120) is an alphanumeric symbol that indicates the order in which the corresponding data (122) was generated.

In one or more embodiments, a packet (116a-116n) may be a metadata packet (124). The metadata packet (124) may include a logical unit (112), a sequence number (120), metadata (126), and a replicator (106). In one or more embodiments, the metadata (126) includes an offset (128) and a length (130). The offset (128) and length (130) may identify a region of memory in a logical unit (112) of the storage array (104) to contain the data (122) to be replicated. In one or more embodiments, the offset (128) indicates the starting address of the region (e.g., relative to the starting address of the logical unit (112)). In one or more embodiments, the length (130) indicates the size of the region (e.g., in terms of a number of bytes).

In one or more embodiments, the replicator (106) of the metadata packet (124) indicates which replicator (e.g., (106a-106n) of FIG. 1A)) is assigned the role of primary replicator for the data packet (118) corresponding to the metadata packet (124). In one or more embodiments, the primary replicator for a data packet (118) is responsible for transmitting the data packet (118) to the target site (108). A metadata packet (124) may correspond to a data packet (118) when both the metadata packet (124) and the data packet (118) share a common logical unit (112) and a common sequence number (120). In one or more embodiments, the replicator (106) may be indicated by an identifier (e.g., "replicator #3"). In one or more embodiments, the replicator (106) may be omitted from the metadata packet (124). For example, if the system (100) of FIG. 1A includes two replicators (106a-106n), then the replicator (106a-106n) in receipt of the metadata packet (124) may infer that the other replicator (106a-106n) is the primary replicator that is in receipt of the corresponding data packet (118).

In one or more embodiments, the data splitter (110) may be implemented in hardware (e.g., circuitry), software, firmware, and/or any combination thereof. For example, data splitter (110) may use such circuitry, in combination with software and/or firmware executing using the circuitry, to route incoming data (e.g., based on a portion of the address of the data) to a specific replicator (106a-106n). In one or more embodiments, the data splitter (110) includes functionality to transmit data packets (118) (e.g., containing data received from the host server (102)) to replicators (106a-106n). In one or more embodiments, the data splitter (110) includes functionality to generate sequence numbers (120) that indicate the order in which the data (122) corresponding to the data packet (118) was received (e.g., from the host server (102)). In one or more embodiments, the data splitter (110) includes functionality to generate metadata (126) corresponding to data (122) to be replicated. In one or more embodiments, the data splitter (110) includes functionality to transmit metadata packets (124) to replicators (106a-106n).

In one or more embodiments, a replicator (106a-106n) includes functionality to transmit a data packet (118) to the target site (108). In one or more embodiments, a replicator (106a-106n) includes functionality to transmit a metadata packet (124) to one or more other replicators (106a-106n).

In one or more embodiments, the target site (108) includes functionality to persist data received in a data packet (118) transmitted by a replicator (106a-106n).

While FIG. 1A and FIG. 1B show configurations of components, other configurations may be used without departing from the scope of the invention. For example, various components may be combined to create a single component. As another example, the functionality performed by a single component may be performed by two or more components.

Figure 2:
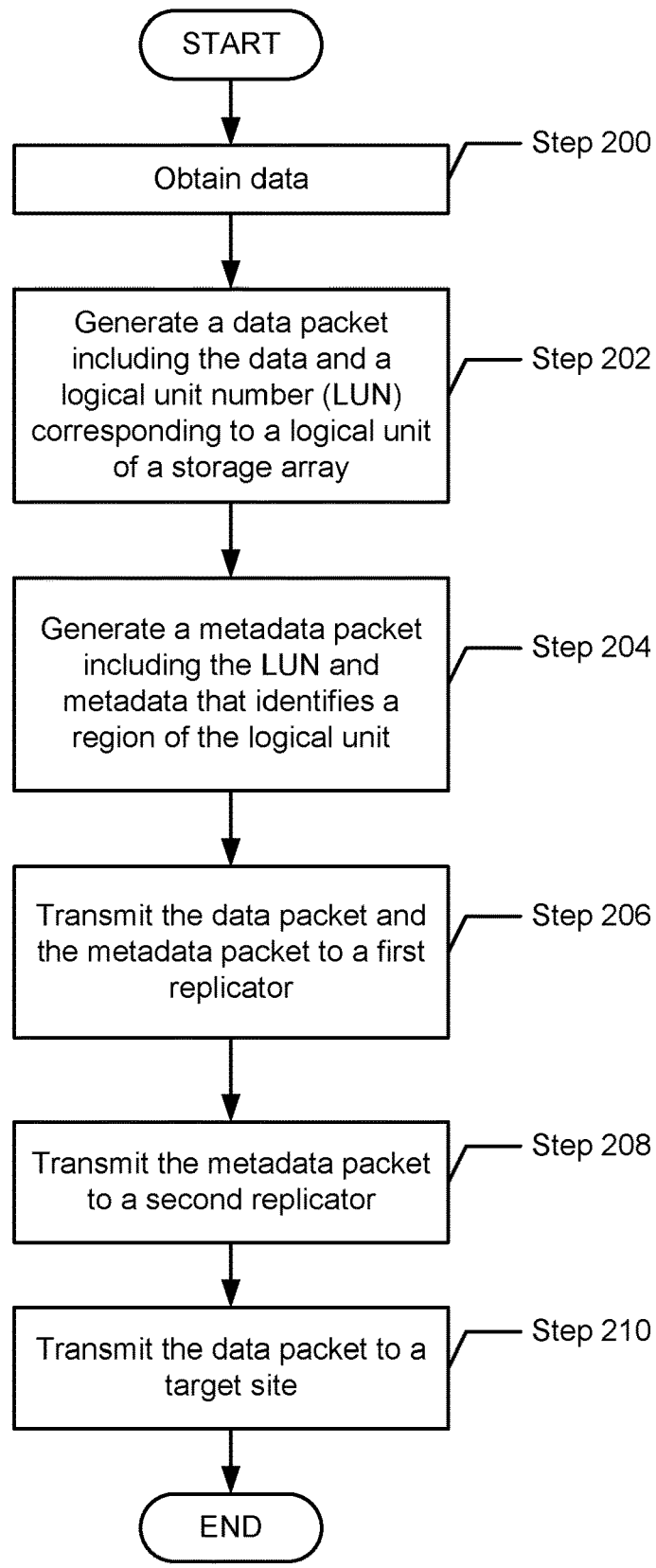
FIG. 2 and FIG. 3 show flowcharts in accordance with one or more embodiments of the invention.

FIG. 2 shows a flowchart in accordance with one or more embodiments of the invention. The flowchart depicts a process for data replication. In one or more embodiments, the process described in reference to FIG. 2 is practiced using the system (100) (e.g., the storage array (104) and replicators (106a-106n)) described in reference to FIG. 1A above, and/or involving the computing system (500) described in reference to FIG. 5A. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, in Step 200, data is obtained. In one or more embodiments, the data may be obtained by the storage array from a host server (e.g., generated by an application program executing on the host server) for the purpose of replication.

In Step 202, a data packet including the data and a logical unit number (LUN) corresponding to a logical unit of a storage array is generated. That is, the data may be associated with (e.g., stored in) a specific logical unit of the storage array. In one or more embodiments, the data packet may be generated by the storage array (e.g., by the data splitter of the storage array).

In one or more embodiments, the data packet may include a sequence number. In one or more embodiments, the sequence number may be used to determine the order in which data included in the data packet is to be persisted (e.g., by the target site, as described below in Step 210). In one or more embodiments, the sequence number may be generated by the storage array. Alternatively, the sequence number may be obtained from the host server (e.g., when the corresponding data is obtained from the host server in Step 200 above).

In Step 204, a metadata packet including the LUN and metadata that identifies a region of the logical unit is generated. In one or more embodiments, the metadata packet may be generated by the storage array (e.g., by the data splitter of the storage array). In one or more embodiments, the metadata packet may be generated by a first (e.g., primary) replicator. In one or more embodiments, the metadata may include an offset and a length that describe the region of the logical unit to contain the data to be replicated. In one or more embodiments, the offset indicates the starting address of the region, and the length indicates the size of the region. In one or more embodiments, the region may be used to contain the data (e.g., in volatile storage and/or non-volatile storage) obtained in Step 200 above. In one or more embodiments, the metadata packet may include the LUN and the sequence number of the data packet generated in Step 202 above.

In Step 206, the data packet and the metadata packet are transmitted to a first replicator. The first replicator may be a computing system whose failure mode is separate from the failure modes of other replicators. In one or more embodiments, the data may be transmitted to the first replicator by the storage array (e.g., by the data splitter). In one or more embodiments, any mechanism or scheme for balancing a workload among a pool of actors may be used (e.g., by the data splitter) in order to balance the assignment of the primary replicator role (e.g., such that, on average, no replicator may be assigned the role of primary replicator more often than any other replicator). Examples of such mechanisms or schemes include, but are not limited to: a round robin algorithm, a random algorithm, a hash-based algorithm, etc. For example, in a scenario using a round robin algorithm where there are two replicators, for the first, third, fifth, etc. data packets, the first replicator may play the role of primary replicator, while in the second, fourth, sixth, etc. data packets, the second replicator may play the role of primary replicator.

In Step 208, the metadata packet is transmitted to a second replicator. In one or more embodiments, the metadata packet may be transmitted to the second replicator by the first replicator. For example, the first replicator may function as a primary replicator that is tasked to perform the replication of the data obtained in Step 200 above, and the second replicator may function as a secondary (e.g., backup) replicator that performs the replication of the data, using the metadata packet, if or when the first replicator fails. In one or more embodiments, the metadata packet may be transmitted to the second replicator by the storage array (e.g., by the data splitter). In a scenario where there are N replicators, for a given data packet, one replicator may play the role of primary replicator, while one or more of the remaining N−1 replicators may play the role of a secondary replicator.

In Step 210, the data packet is transmitted to a target site. In one or more embodiments, the data packet is transmitted by the first replicator. In one or more embodiments, the target site persists the data contained in the data packet in accordance with the sequence number of the data packet. In one or more embodiments, the target site transmits an acknowledgment to the first replicator once the data contained in the data packet has been persisted at the target site.

In one or more embodiments, the above sequence of steps (i.e., from Step 200 to Step 210) may be performed for a stream of data to be replicated. In one or more embodiments, when the target site receives a stream of data packets, the target site persists a sequence of data according to the sequence numbers of the respective data packets. In this manner, write-order fidelity may be preserved, such that the data is replicated in the sequence in which the data was generated (e.g., by the host server).

Transmitting the metadata (e.g., instead of transmitting the data) to secondary replicators may reduce the overall transmission overhead, which may reduce the load placed on network resources, and increase the effective network throughput. Therefore, write-order fidelity may be preserved at the target site, due to less frequent reordering of data packets due to networking delays.

Figure 3:
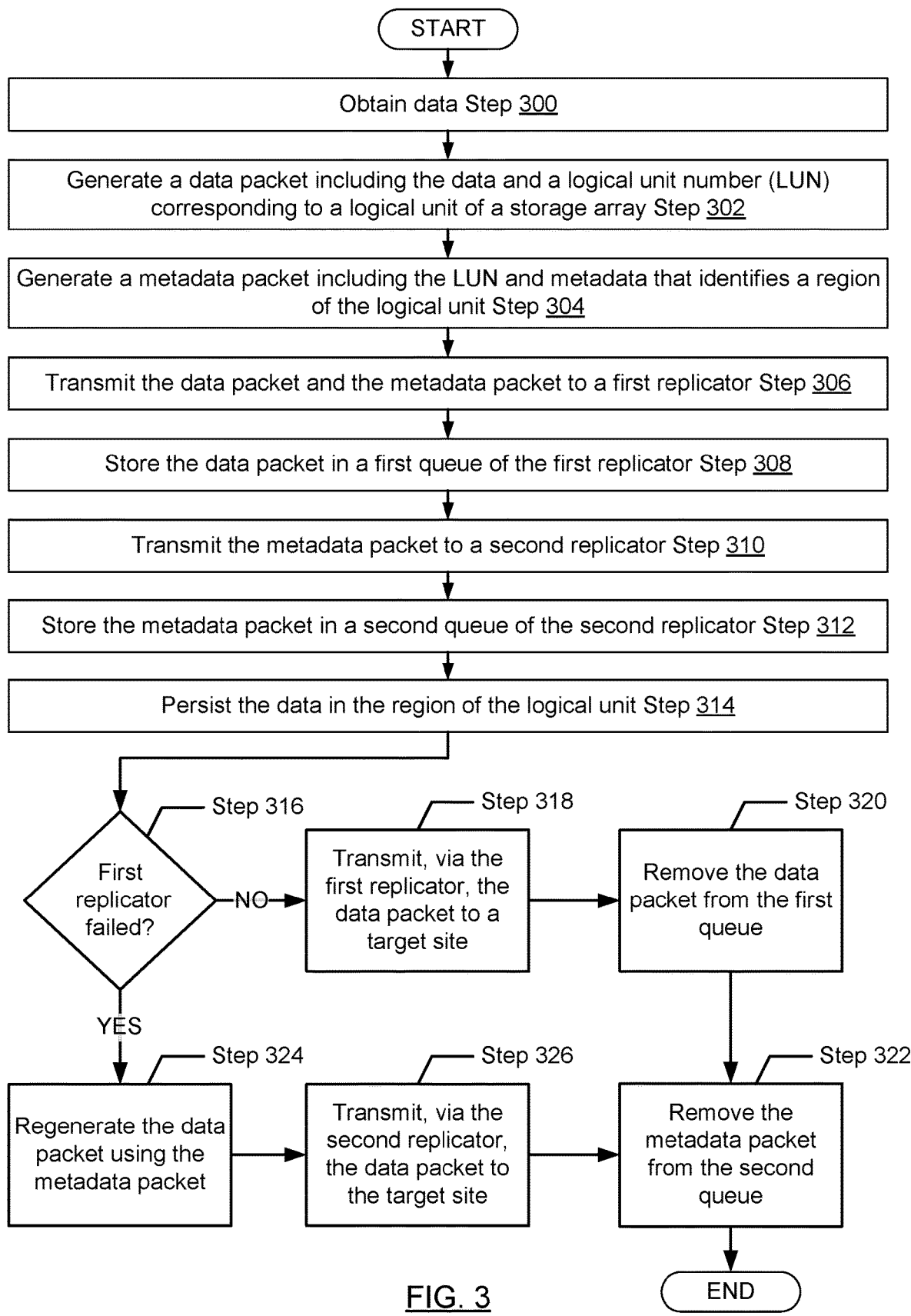

FIG. 3 shows a flowchart in accordance with one or more embodiments of the invention. The flowchart depicts a process for data replication. In one or more embodiments, the process described in reference to FIG. 3 is practiced using the system (100) (e.g., the storage array (104) and replicators (106a-106n)) described in reference to FIG. 1A above, and/or involving the computing system (500) described in reference to FIG. 5A. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3.

Initially, in Step 300, data is obtained (see description above of Step 200 in FIG. 2).

In Step 302, a data packet including the data and a logical unit number (LUN) corresponding to a logical unit of a storage array is generated (see description above of Step 202 in FIG. 2).

In Step 304, a metadata packet including the LUN and metadata that identifies a region of the logical unit is generated (see description above of Step 204 in FIG. 2).

In Step 306, the data packet and the metadata packet are transmitted to a first replicator (see description above of Step 206 in FIG. 2).

In Step 308, the data packet is stored in a first queue of the first replicator.

In one or more embodiments, the packets of the first queue may be processed in a first-in-first-out (FIFO) order. In one or more embodiments, processing packets in a FIFO order preserves write-order fidelity. In one or more embodiments, the packets of the first queue may be processed in an order based on a criterion for sorting and/or organizing the various packets of the first queue. For example, the criterion may be based on relationships among the data and/or metadata contained in the packets of the first queue.

In Step 310, the metadata packet is transmitted to a second replicator (see description above of Step 208 in FIG. 2).

In Step 312, the metadata packet is stored in a second queue of the second replicator (see description above of Step 308). In one or more embodiments, an acknowledgement may be transmitted (e.g., by the second replicator to the first replicator) once the metadata packet is stored in the second queue.

In Step 314, the data is persisted in the region of the logical unit. In one or more embodiments, the data is written (e.g., by the storage array) to non-volatile storage corresponding to the region of the logical unit (e.g., the region corresponding to the metadata). In one or more embodiments, the data is persisted in response to an acknowledgement indicating that the data packet has been stored in the first queue and that the metadata packet has been stored in the second queue. In one or more embodiments, until the acknowledgement is received, the data may reside in volatile storage corresponding to the region of the logical unit. In one or more embodiments, the acknowledgement may be transmitted by the first (e.g., primary) replicator.

If, in Step 316, it is determined that the first replicator has not failed, then in Step 318 the data packet is transmitted, by the first replicator, to a target site (see description above of Step 210 in FIG. 2). Otherwise, if it is determined that the first replicator has failed, then execution proceeds with Step 324 below. In one or more embodiments, the failure of the first replicator may be detected by noticing the absence of a "heartbeat" of the first replicator. In one or more embodiments, the heartbeat may be monitored (e.g., by the second replicator) via periodic pinging of the first replicator, and concluding that a failure has occurred if the first replicator does not send an acknowledgment in response. Alternatively, the heartbeat may be broadcast by the first replicator at periodic intervals.

In Step 320, the data packet is removed from the first queue. In one or more embodiments, the data packet is removed from the first queue in response to an acknowledgment from the target site indicating that the target site has persisted the data contained in the data packet. In one or more embodiments, the acknowledgment is received by the first replicator.

In Step 322, the metadata packet is removed from the second queue. In one or more embodiments, the metadata packet is removed from the second queue in response to the acknowledgment from the target site indicating that the target site has persisted the data contained in the data packet. In one or more embodiments, the first replicator may inform the second replicator of the receipt of the acknowledgment from the target site.

In Step 324, the data packet is regenerated using the metadata packet. In one or more embodiments, the data to be replicated may be retrieved from the region of the logical unit of the storage array corresponding to the offset and length of the metadata in the metadata packet (see description above of Step 204 in FIG. 2). In one or more embodiments, the data packet may be regenerated using the retrieved data and the metadata packet. In one or more embodiments, the data packet may be regenerated by the second replicator.

In Step 326, the data packet is transmitted, by the second replicator, to the target site (see description above of Step 210 in FIG. 2). Then, execution continues with Step 322 above.

In one or more embodiments, the steps of FIG. 3 above may be performed for a stream of data to be replicated (see description above of FIG. 2). Processing the packets of the queue in FIFO order may preserve the order of the data packets (e.g., relative to the sequence numbers of the respective packets) when the data packets are transmitted to the target site, thereby improving write-order fidelity.

In one or more embodiments, the sequence number of each packet determines the order in which the corresponding packet will be processed. For example, in Step 316 above, the second replicator may be in the midst of processing a current data packet when the failure of the first replicator is detected. Upon detecting the failure, the second replicator may, in Step 324 above, first regenerate any data packets corresponding to metadata packets in the second queue whose sequence numbers precede the sequence number of the current data packet. For example, the presence of a metadata packet in the second queue may indicate that the data corresponding to the metadata packet has not yet been persisted at the target site, and therefore the second replicator may assume the role of primary replicator (since that the first replicator has failed) for any metadata packets remaining in the second queue.

In one or more embodiments, after the failure of the first replicator occurs, the target site may save a consistent checkpoint of the persisted data at the target site once the metadata packets remaining in the second queue have been processed (e.g., once the data corresponding to the metadata packets has been regenerated and transmitted to the target site).

In one or more embodiments, after processing metadata packets in the second queue whose sequence numbers precede the sequence number of the current data packet, the processing of the current data packet may be resumed and completed. In one or more embodiments, after the processing of the current data packet has been completed, if the first replicator is not yet back online, the second replicator continues to process the packets (i.e., both data packets and metadata packets) in the second queue according to the order of the sequence numbers of the packets.

In one or more embodiments, Step 324 and Step 326 may be performed when the replicator indicated in the metadata packet matches the identity of the failed replicator (e.g., the first replicator). Alternatively (e.g., in a scenario where there are more than two replicators), it may be the case that the failed replicator does not match the replicator indicated in the metadata packet, in which case Step 324 and Step 326 may not be performed relative to the metadata packet.

In one or more embodiments, in a scenario where there are N replicators, Step 324 and Step 326 may be performed by a replicator selected by the remaining N−1 replicators (e.g., using a voting algorithm).

In a scenario where there are N replicators, each replicator may play the role of primary replicator for every Nth unit of data, and play the role of secondary replicator for the other N−1 units of data. For example, a given data packet in the stream may be transmitted to the primary replicator, while the other N−1 replicators receive a metadata packet corresponding to the data packet.

The number of replicators may affect the robustness of the overall replication mechanism. That is, the larger the size of the replicator pool, the more failures the overall replication mechanism may accommodate while continuing to perform replication. For example, if there are N replicators, replication may proceed even if N−1 of the replicators fail. That is, the one non-failing replicator may transmit the data (regenerated using the metadata packets in Step 324 above) assigned to the N−1 failing replicators.

The following example is for explanatory purposes only and not intended to limit the scope of the invention. FIG. 4A, FIG. 4B, FIG. 4C, and FIG. 4D show an implementation example in accordance with one or more embodiments of the invention.

Figure 4A:
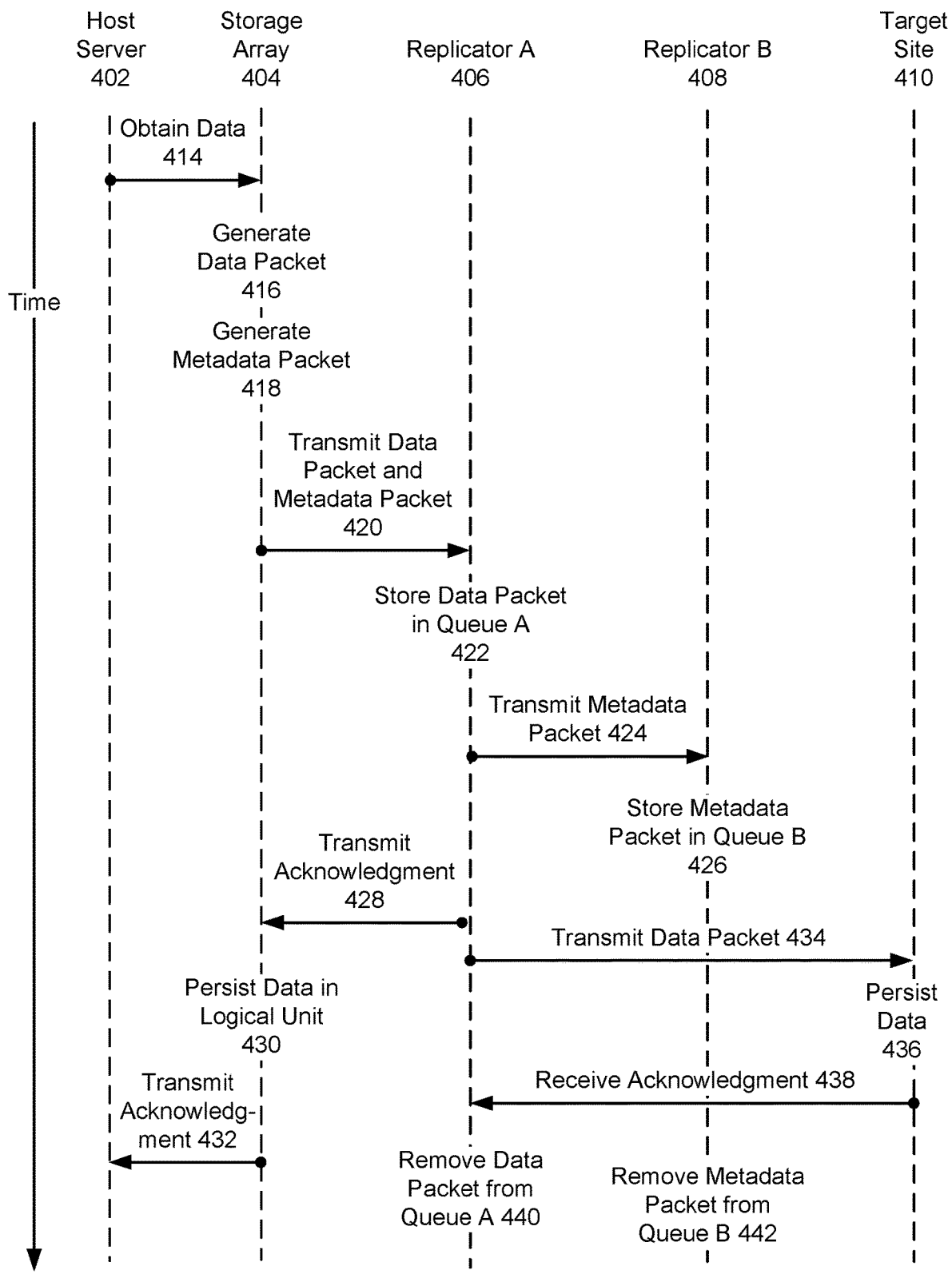
FIG. 4A, FIG. 4B, FIG. 4C, and FIG. 4D show examples in accordance with one or more embodiments of the invention.

FIG. 4A illustrates, in accordance with one or more embodiments, the relative timing of steps performed by one or more components described in reference to FIG. 1A and FIG. 1B, in accordance with the flowcharts in FIG. 2 and FIG. 3. These components include: a host server (402) ((102) in FIG. 1A), a storage array (404) ((104) in FIG. 1A), replicator A (406) ((106a-106n) in FIG. 1A), replicator B (408) ((106a-106n) in FIG. 1A), and a target site (410) ((108) in FIG. 1A).

Initially, in Step 414, the storage array (404) obtains data from the host server (402) (e.g., from an enterprise application program executing on the host server (402)) for the purpose of replication.

Figure 4B:
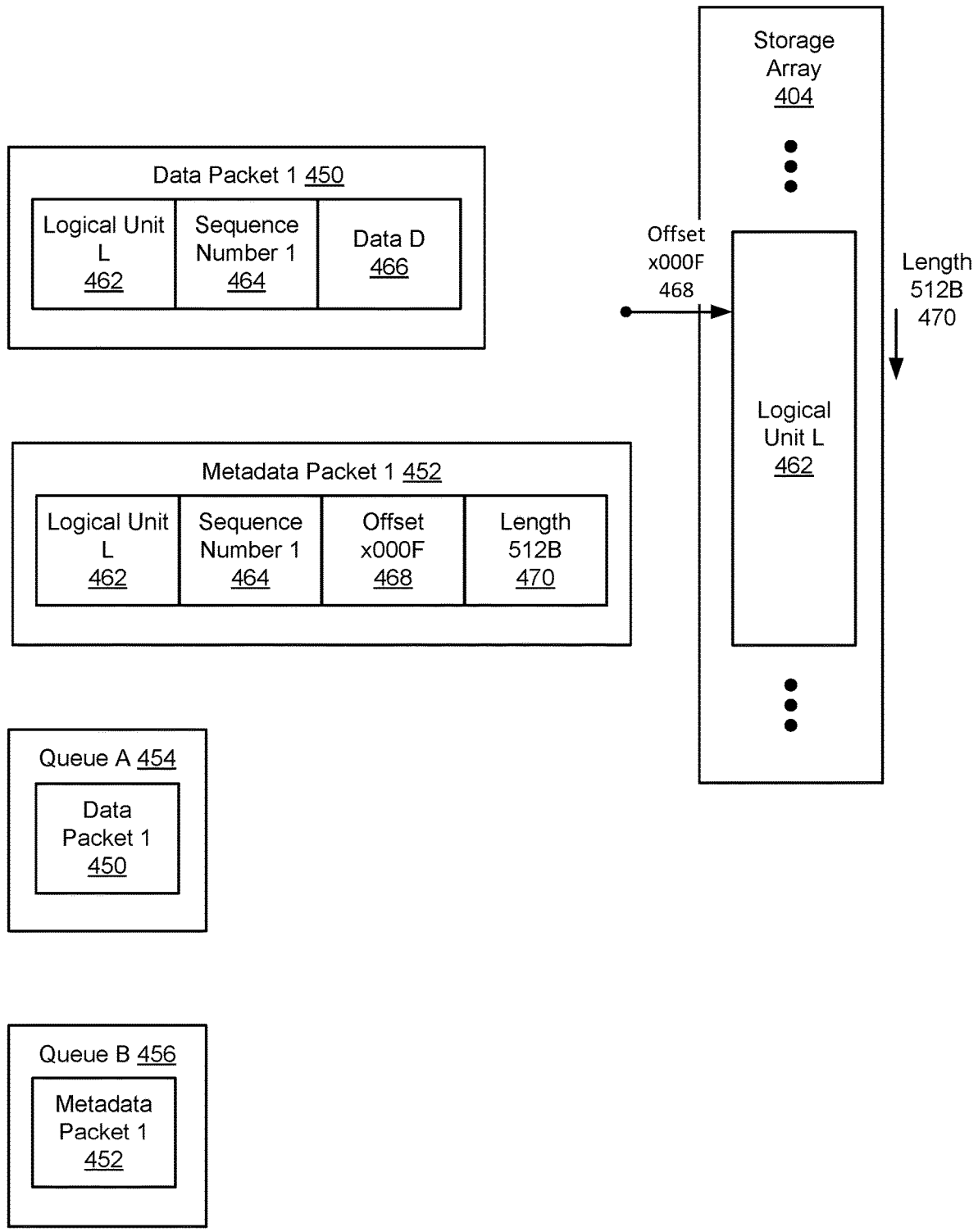

In Step 416, the storage array (404) generates a data packet 1. As shown in FIG. 4B, data packet 1 (450) refers to logical unit L (462) of the storage array (404), has sequence number 1 (464), and includes data D (466) (i.e., the data obtained in Step 414 above).

In Step 418, the storage array (404) generates metadata packet 1. As shown in FIG. 4B, metadata packet 1 (452) refers to logical unit L (462), has sequence number 1 (464), and includes an offset x000F (468) and a length 512B (470). The offset x000F (468) and length 512B (470) describe a region of logical unit L (462) to contain the data (466), as shown in FIG. 4B. In a scenario where there are more than two replicators, then metadata packet 1 (452) would also need to include a field that identifies the primary replicator (e.g., as shown in FIG. 1B), thereby enabling the secondary replicator that receives metadata packet 1 (452) to know the identity of the corresponding primary replicator for metadata packet 1 (452).

In Step 420, the storage array (404) transmits data packet 1 (450) and metadata packet 1 (452) to replicator A (406). Replicator A (406) is therefore the primary replicator for the data (466) obtained in Step 414, and was assigned the role of primary replicator based on a round-robin algorithm.

In Step 422, replicator A (406) stores data packet 1 (450) in queue A (454), as shown in FIG. 4B.

In Step 424, replicator A (406) transmits metadata packet 1 (452) to replicator B (408). Replicator B (408) is therefore the secondary (e.g., backup) replicator for the data (466) obtained in Step 414.

In Step 426, replicator B (408) stores metadata packet 1 (452) in queue B (456), as shown in FIG. 4B. Replicator B (408) then sends an acknowledgment to replicator A (406) indicating that the metadata packet 1 (452) has been successfully stored.

In Step 428, replicator A (406) transmits an acknowledgement to the storage array (404) indicating that data packet 1 (450) and metadata packet 1 (452) have been stored in the respective queues (454, 456) of replicator A (406) and replicator B (408).

In Step 430, the storage array (404) persists (e.g., in non-volatile storage) the data (466) in the region of logical unit L (462) described by the offset (468) and length (470). That is, the data (466) is not persisted until it is confirmed that the corresponding data packet 1 (450) and metadata packet 1 (452) have been stored by the primary and secondary replicators (406, 408).

In Step 432, the storage array (404) transmits an acknowledgement to the host server (402) indicating that the data (466) to be replicated has been persisted in the storage array (404).

In Step 434, replicator A (406) transmits data packet 1 (450) to the target site (410), which in turn, in Step 436, persists the data (466) included in data packet 1 (450).

In Step 438, replicator A (406) receives an acknowledgement from the target site (410), indicating that the data (466) has been successfully persisted at the target site (410).

In Step 440, replicator A (406) removes data packet 1 (450) from queue A (454). That is, now that the data (466) in data packet 1 (450) has been persisted at the target site (410), it is unnecessary to continue to retain data packet 1 (450) in queue A (454). Replicator A (406) then forwards this acknowledgment to replicator B (408).

In Step 442, replicator B (408) removes metadata packet 1 (452) from queue B (456). That is, now that the data (466) in data packet 1 (450) has been persisted at the target site (410), it is unnecessary to continue to retain metadata packet 1 (452) in queue B (456).

Figure 4C:
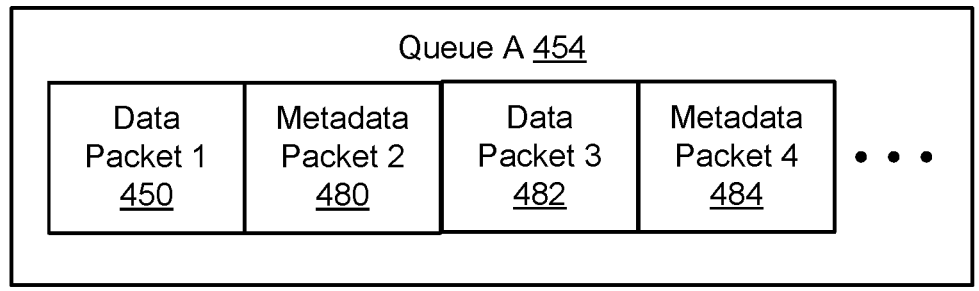
Figure 4C:
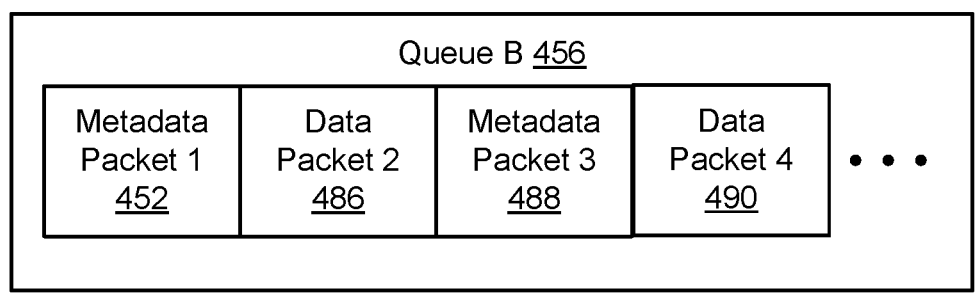

The steps of FIG. 4A are then repeated for additional units of data to be replicated. However, in the next iteration of the steps of FIG. 4A, the roles of replicator A (406) and replicator B (408) are reversed. That is, replicator B (408) plays the role of primary replicator (e.g., replicator B (408) stores a data packet in queue B (456)), and replicator A (406) plays the role of secondary replicator (e.g., replicator A (406) stores a metadata packet in queue A (454)). FIG. 4C illustrates how the queues (454, 456) of replicator A (406) and replicator B (408) contain alternating sequences of data packets and metadata packets. That is, when replicator A (406) plays the role of primary replicator, the corresponding packet in queue A (454) is a data packet (450, 482), and when replicator A (406) plays the role of secondary replicator, the corresponding packet in queue A (454) is a metadata packet (480, 484). Similarly, when replicator B (408) plays the role of primary replicator, the corresponding packet in queue B (456) is a data packet (486, 490), and when replicator B (408) plays the role of secondary replicator, the corresponding packet in queue B (456) is a metadata packet (452, 488).

Figure 4D:
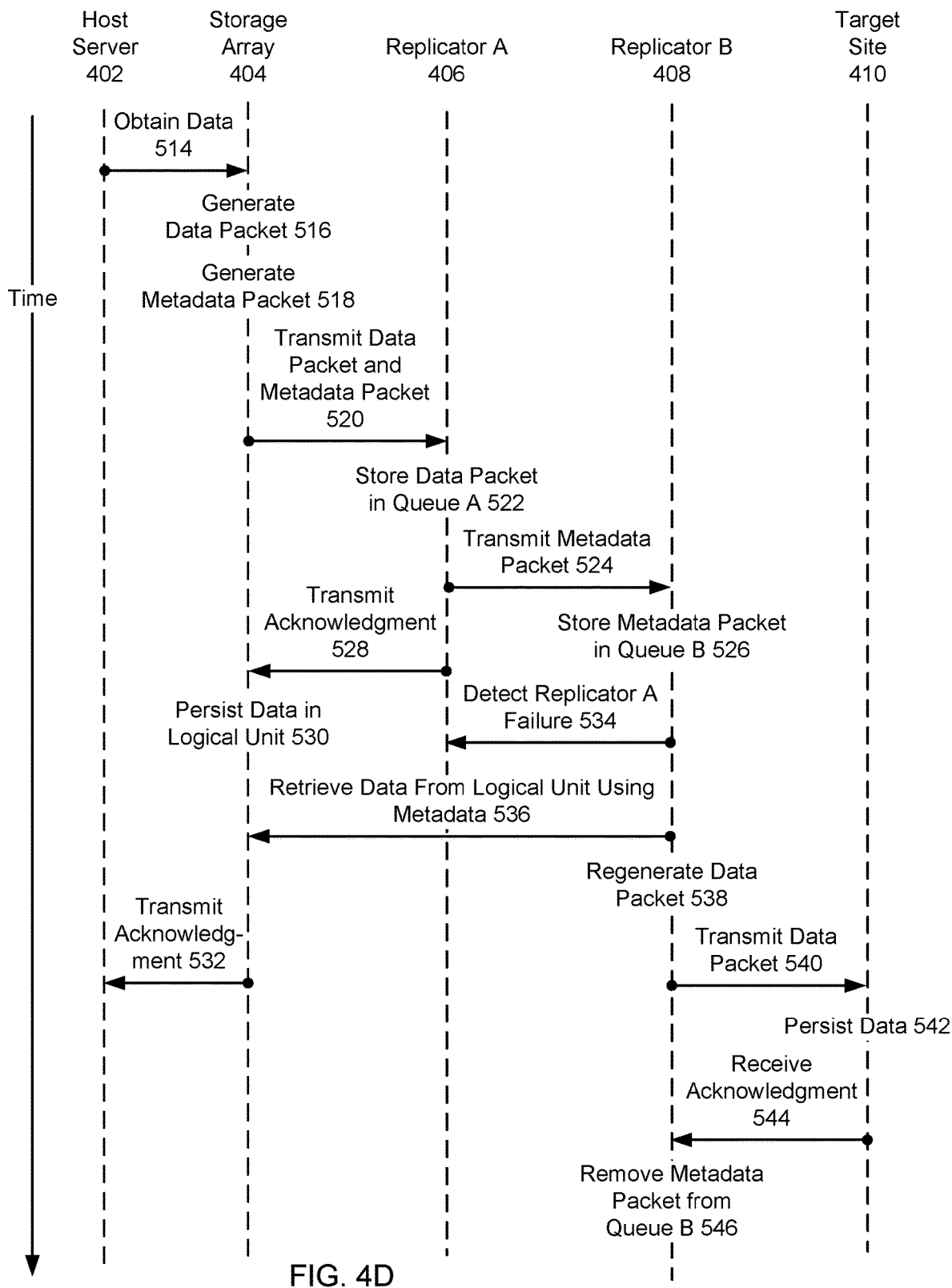

FIG. 4D illustrates, in accordance with one or more embodiments, the relative timing of steps performed by one or more components described in reference to FIG. 1A and FIG. 1B, in accordance with the flowcharts in FIG. 2 and FIG. 3. FIG. 4D illustrates a scenario similar to the scenario illustrated in FIG. 4A, except that in FIG. 4D, replicator A (406) incurs a failure.

Initially, in Step 514, the storage array (404) obtains data from the host server (402) for the purpose of replication (see description above of Step 414 in FIG. 4A).

In Step 516, the storage array (404) generates data packet 1 (450) (see description above of Step 416 in FIG. 4A).

In Step 518, the storage array (404) generates metadata packet 1 (452) (see description above of Step 418 in FIG. 4A).

In Step 520, the storage array (404) transmits data packet 1 (450) and metadata packet 1 (452) to replicator A (406) (see description above of Step 420 in FIG. 4A).

In Step 522, replicator A (406) stores data packet 1 (450) in queue A (454) (see description above of Step 422 in FIG. 4A).

In Step 524, replicator A (406) transmits metadata packet 1 (452) to replicator B (408) (see description above of Step 424 in FIG. 4A).

In Step 526, replicator B (408) stores metadata packet 1 (452) in queue B (456) (see description above of Step 426 in FIG. 4A).

In Step 528, replicator A (406) transmits an acknowledgement to the storage array (404) (see description above of Step 428 in FIG. 4A).

In Step 530, the storage array (404) persists the data (466) in the region of logical unit L (462) described by the offset (468) and length (470) (see description above of Step 430 in FIG. 4A).

In Step 532, the storage array (404) transmits an acknowledgement to the host server (402) (see description above of Step 432 in FIG. 4A).

In Step 534, replicator B (408) detects the failure of replicator A (406) (e.g., when a periodic heartbeat from replicator A (406) is no longer detected).

In Step 536, replicator B (408) retrieves the data (466) to be replicated from the region of logical unit L (462) corresponding to the metadata (i.e., offset (468) and length (470)) in metadata packet 1 (452).

In Step 538, replicator B (408) regenerates data packet 1 (450) using the data (466) retrieved in Step 536 above, and metadata packet 1 (452). The logical unit (462) and sequence number (464) are extracted from the metadata packet 1 (452) and are used to populate the corresponding fields of data packet 1 (450).

In Step 540, replicator B (408) transmits data packet 1 (450) to the target site (410), which then, in Step 542, persists the data (466) included in data packet 1 (450) (see description above of Step 434 in FIG. 4A).

In Step 544, replicator B (408) receives an acknowledgement from the target site (410) indicating that the data (466) to be replicated has been persisted at the target site (410) (see description above of Step 438 in FIG. 4A).

In Step 546, replicator B (408) removes metadata packet 1 (452) from queue B (456). That is, now that the data (466) in data packet 1 (450) has been persisted at the target site (410), it is unnecessary to continue to retain metadata packet 1 (452) in queue B (456) (see description above of Step 442 in FIG. 4A). If replicator A (406) is back online, then replicator B (408) may instruct replicator A (406) to remove data packet 1 (450) from queue A (454).

After the failure of replicator A (406), there may be multiple metadata packets (452, 488, etc.) in queue B (456), as illustrated in FIG. 4C. Replicator B (408) is responsible for regenerating a data packet corresponding to each metadata packet (452, 488) in queue B (456), and then transmitting the regenerated data packet to the target site (410). Upon detecting the failure in Step 534 above, replicator B (408) first regenerates any data packets corresponding to metadata packets in queue B (456) whose sequence numbers precede the sequence number of the data packet currently being processed by replicator B (408) at the time the failure was detected.

In the scenario illustrated in FIG. 4C, replicator B (408) was processing data packet 2 (486) when the failure of replicator A (406) was detected. Since the sequence number (i.e., 1) of metadata packet 1 (452) precedes the sequence number (i.e., 2) of data packet 2 (486), replicator B (408) switches to processing metadata packet 1 (452). After replicator B (408) completes the processing of metadata packet 1 (452), it resumes and completes the processing of data packet 2 (486). Next, since replicator A (406) is still offline, replicator B (408) processes metadata packet 3 (488) before processing data packet 4 (490), because the sequence number (i.e., 3) of metadata packet 3 (488) precedes the sequence number (i.e., 4) of data packet 4 (490).

Figure 5A:
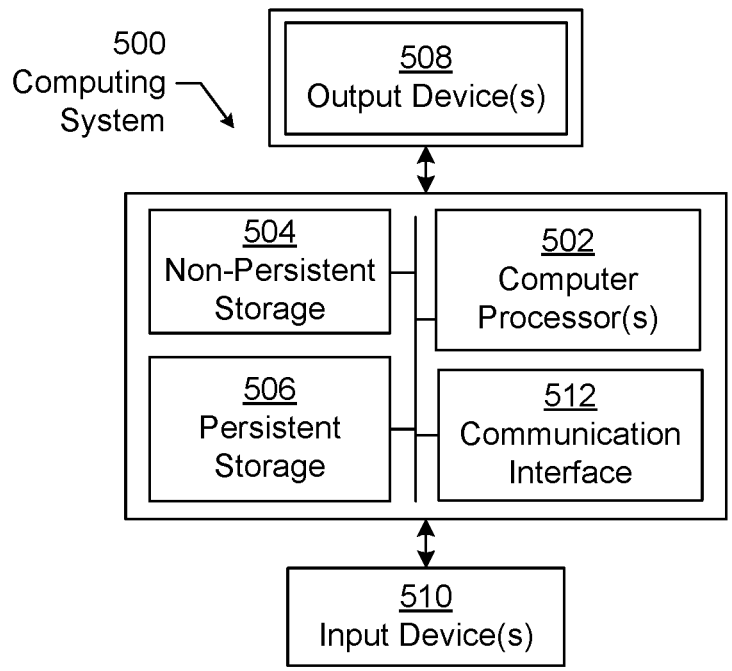
FIG. 5A and FIG. 5B show computing systems in accordance with one or more embodiments of the invention.

Embodiments disclosed herein may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 5B:
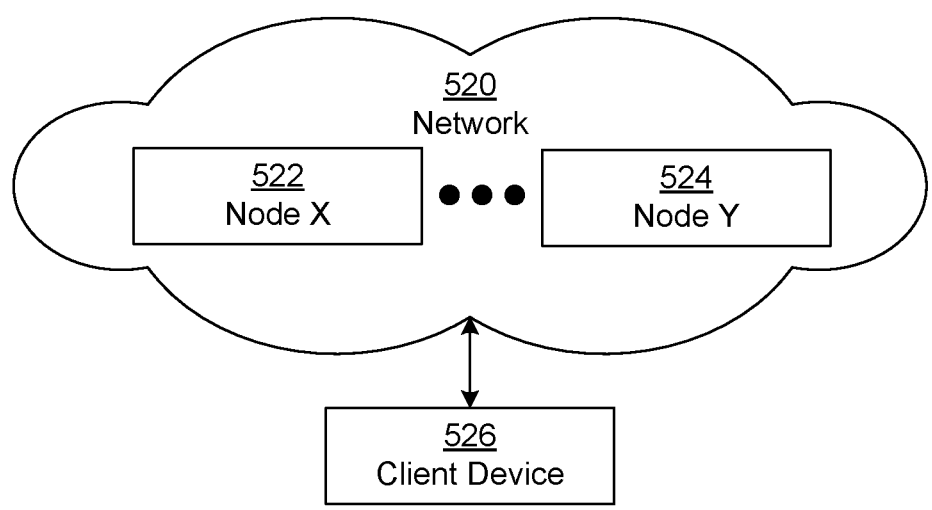

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments disclosed herein.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object.

The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments disclosed herein.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for data replication, comprising:
obtaining, by a storage array, first data and second data;
generating, by the storage array:
a first data packet comprising the first data, a first sequence number, and a first logical unit number (LUN) corresponding to a first logical unit of the storage array, and
a second data packet comprising the second data, a second sequence number, and a second LUN corresponding to a second logical unit of the storage array;
generating, by the storage array, a first metadata packet comprising the first LUN, the first sequence number, and first metadata that comprises a first offset and a first length which identifies a first region of the first logical unit;
generating, by the storage array, a second metadata packet comprising the second LUN, the second sequence number, and second metadata that comprises a second offset and a second length which identifies a second region of the second logical unit;
transmitting, by the storage array:
the first data packet and the first metadata packet to a first replicator, and
the second data packet and the second metadata packet to a second replicator;
transmitting, by the first replicator, the first metadata packet to the second replicator;
transmitting, by the second replicator, the second metadata packet to the first replicator;
storing at least the first data packet and the second metadata packet in a queue of the first replicator in alternating sequences;
storing at least the first metadata packet and the second data packet in a queue of the second replicator in alternating sequences;
initiating, by the first replicator, processing of the first data packet;
initiating, by the second replicator, processing of the second data packet;
detecting, by the second replicator, a first failure of the first replicator;
determining, by the second replicator, that a metadata packet in the queue of the second replicator comprises a sequence number that precedes the second sequence number, and
corresponds to the first replicator;
in response to detecting the first failure of the first replicator and the determining: regenerating, by the second replicator, using the metadata packet in the queue of the second replicator, and before completing the processing of the second data packet, the data packet corresponding to the metadata packet in the queue of the second replicator, wherein regenerating the data packet comprises retrieving data from a region of a logical unit of the storage array corresponding to an offset and a length of metadata in the metadata packet and regenerating the data packet from the retrieved data;
transmitting, by the second replicator, the regenerated data packet to a target site;
receiving a first acknowledgment from the target site indicating that the target site has persisted the first data;
removing, in response to the first acknowledgment, the first data packet from the queue of the first replicator; and
removing, in response to the first acknowledgment, the first metadata packet from the queue of the second replicator.

2. The method of claim 1, further comprising:
transmitting the second data packet to the target site.

3. The method of claim 2, further comprising:
transmitting, by the first replicator, the first metadata packet to a third replicator;
transmitting, by the second replicator, the second metadata packet to the third replicator;
detecting, by the third replicator, a second failure of the second replicator; and
regenerating, by the third replicator, in response to detecting the second failure and using the second metadata packet, the second data packet.

4. The method of claim 1, further comprising:
transmitting a second acknowledgment in response to storing the first data packet in the queue of the first replicator; and
persisting the first data in the first region in response to the second acknowledgment.

5. The method of claim 1, wherein:
the target site receives a stream of data packets, each data packet of the stream of data packets comprising data and a sequence number,
the target site persists the data of each data packet of the stream of data packets in a sequence according to the sequence number of the data packet, and
the stream of data packets comprises the first data packet.

6. A system for data replication, comprising:
a plurality of replicators comprising a first replicator and a second replicator; and
a storage array configured to:
obtain, from a host server, first data and second data;
generate a first data packet comprising the first data, a first sequence number, and a first logical unit number (LUN) corresponding to a first logical unit of the storage array;
generate a second data packet comprising the second data, a second sequence number, and a second LUN corresponding to a second logical unit of the storage array;
generate a first metadata packet comprising the first LUN, the first sequence number, and first metadata that comprises a first offset and a first length which identifies a first region of the first logical unit;
generate a second metadata packet comprising the second LUN, the second sequence number, and second metadata that comprises a second offset and a second length which identifies a second region of the second logical unit;
transmit the first data packet and the first metadata packet to the first replicator; and
transmit the second data packet and the second metadata packet to a second replicator, wherein the first replicator comprises a first computer processor and is configured to:
  transmit the first metadata packet to the second replicator,
  store at least the first data packet and the second metadata packet in a queue of the first replicator in alternating sequences,
  initiate processing of the first data packet,
  receive a first acknowledgment from the target site indicating that the target site has persisted the first data, and
  remove, in response to the first acknowledgment, the first data packet from the queue of the first replicator, and
wherein the second replicator comprises a second computer processor and is configured to:
  transmit the second metadata packet to the first replicator;
  store at least the first metadata packet and the second data packet in a queue of the second replicator in alternating sequences;
  initiate processing of the second data packet;
  detect a first failure of the first replicator;
  determine that a metadata packet in the queue of the second replicator comprises a sequence number that precedes the second sequence number, and corresponds to the first replicator;
  in response to detecting the first failure of the first replicator and the determining: regenerate, using the metadata packet in the queue of the second replicator, and before completing the processing of the second data packet, the data packet corresponding to the metadata packet in the queue of the second replicator, wherein regenerating the data packet comprises retrieving data from a region of a logical unit of the storage array corresponding to an offset and a length of metadata in the metadata packet and regenerating the data packet from the retrieved data;
  transmit the regenerated data packet to a target site;
  receive the first acknowledgment from the target site indicating that the target site has persisted the first data, and
  remove, in response to the first acknowledgment, the first metadata packet from the queue of the second replicator.

7. The system of claim 6,
wherein the second replicator is further configured to transmit the second data packet to the target site.

8. The system of claim 7,
wherein the plurality of replicators further comprises a third replicator,
wherein the first replicator is further configured to:
  transmit the first metadata packet to the third replicator,
wherein the second replicator is further configured to:
  transmit the second metadata packet to the third replicator, and
wherein the third replicator is configured to:
  detect a second failure of the second replicator;
  regenerate, in response to detecting the second failure and using the second metadata packet, the second data packet; and
  transmit the second data packet to the target site.

9. A non-transitory set of one or more computer readable mediums comprising instructions that, when executed by a set of one or more computer processors, perform a method for data replication comprising:
  obtaining, by a storage array, first data and second data;
  generating, by the storage array:
    a first data packet comprising the first data, a first sequence number, and a first logical unit number (LUN) corresponding to a first logical unit of the storage array, and
    a second data packet comprising the second data, a second sequence number, and a second LUN corresponding to a second logical unit of the storage array;
  generating, by the storage array, a first metadata packet comprising the first LUN, the first sequence number, and first metadata that comprises a first offset and a first length which identifies a first region of the first logical unit;
  generating, by the storage array, a second metadata packet comprising the second LUN, the second sequence number, and second metadata that comprises a second offset and a second length which identifies a second region of the second logical unit;
  transmitting, by the storage array:
    the first data packet and the first metadata packet to a first replicator, and
    the second data packet and the second metadata packet to a second replicator;
  transmitting, by the first replicator, the first metadata packet to the second replicator;
  transmitting, by the second replicator, the second metadata packet to the first replicator;
  storing at least the first data packet and the second metadata packet in a queue of the first replicator in alternating sequences;
  storing at least the first metadata packet and the second data packet in a queue of the second replicator in alternating sequences;
  initiating, by the first replicator, processing of the first data packet;
  initiating, by the second replicator, processing of the second data packet;
  detecting, by the second replicator, a first failure of the first replicator;
  determining, by the second replicator, that a metadata packet in the queue of the second replicator comprises a sequence number that precedes the second sequence number, and corresponds to the first replicator;
  in response to detecting the first failure of the first replicator and the determining: regenerating, by the second replicator, using the metadata packet in the queue of the second replicator, and before completing the processing of the second data packet, the data packet corresponding to the metadata packet in the queue of the second replicator, wherein regenerating the data packet comprises retrieving data from a region of a logical unit of the storage array corresponding to an offset and a length of metadata in the metadata packet and regenerating the data packet from the retrieved data;
  transmitting, by the second replicator, the regenerated data packet to a target site;
  receiving a first acknowledgment from the target site indicating that the target site has persisted the first data;
  removing, in response to the first acknowledgment, the first data packet from the queue of the first replicator; and
  removing, in response to the first acknowledgment, the first metadata packet from the queue of the second replicator.

10. The non-transitory set of one or more computer readable mediums of claim 9, wherein the method for data replication further comprises:
transmitting the second data packet to the target site.

11. The non-transitory set of one or more computer readable mediums of claim 10, wherein the method for data replication further comprises:
transmitting, by the first replicator, the first metadata packet to a third replicator;
transmitting, by the second replicator, the second metadata packet to the third replicator;
detecting, by the third replicator, a second failure of the second replicator; and
regenerating, by the third replicator, in response to detecting the second failure and using the second metadata packet, the second data packet.

* * * * *